US006185698B1

(12) United States Patent
Wesley et al.

(10) Patent No.: US 6,185,698 B1
(45) Date of Patent: Feb. 6, 2001

(54) METHOD AND APPARATUS USING RANKING TO SELECT REPAIR NODES IN FORMATION OF A DYNAMIC TREE FOR MULTICAST REPAIR

(75) Inventors: Joseph Wesley, Quincy, MA (US); Stephen A. Hurst, Nashua, NH (US); Miriam C. Kadansky, Westford, MA (US); Stephen R. Hanna, Bedford, MA (US); Philip M. Rosenzweig, Acton, MA (US); Dah Ming Chiu, Acton, MA (US); Radia J. Perlman, Acton, MA (US)

(73) Assignee: Sun Microsystems, Incorporated, Palo Alto, CA (US)

(*) Notice: Under 35 U.S.C. 154(b), the term of this patent shall be extended for 0 days.

(21) Appl. No.: 09/063,498

(22) Filed: Apr. 20, 1998

(51) Int. Cl.[7] ........................................ G06F 11/00
(52) U.S. Cl. .................................................. 714/18
(58) Field of Search ............................. 714/18, 20, 38, 714/35, 4, 748; 709/219, 217, 218, 223

(56) References Cited

U.S. PATENT DOCUMENTS

| 5,754,939 | * | 5/1998 | Herz et al. ........................... 709/219 |
| 5,835,087 | * | 11/1998 | Herz et al. ........................... 345/327 |
| 5,983,366 | * | 11/1999 | King ..................................... 714/38 |
| 6,029,195 | * | 2/2000 | Herz ..................................... 709/219 |

OTHER PUBLICATIONS

Multicast Addressing Douglas E. Comer PP 281–290, 1991.*
D. Katz, RFC 2113 entitled "IP Router Alert Option", published Feb. 1997.
Douglas E. Comer, Chapter 17, entitled "Multicast Addressing (IGMP)" in Book entitled *Internetworking with TCP/IP vol. 1 Principles, Protocols, and Architecture* 2nd Edition, published by Prentice Hall, 1991, pp. 281–290.

* cited by examiner

*Primary Examiner*—Robert W. Beausoliel, Jr.
*Assistant Examiner*—Pierre Eddy Elisca
(74) *Attorney, Agent, or Firm*—Squire, Sanders & Dempsey L.L.P.

(57) ABSTRACT

An embodiment consistent with the present invention includes a method and apparatus for forming a multicast repair tree. The method may be performed by a data processor and comprises the steps of determining, for each of a plurality of potential heads in a multicast group, a ranking value associated with the potential head; advertising, by the potential heads to a plurality of potential receivers; prioritizing, by a potential receiver, the ranking values from the potential heads; and binding, by a potential receiver to the head having the highest ranking value, thereby forming a group of which the potential receiver is a member and the potential head is the head. The head may also be the sender. There may be a plurality of heads. The ranking values may include "able", "unable", "willing", and "reluctant." The ranking value of a potential head may be determined in accordance with a static or a dynamic configuration. Ranking values may be determined dynamically based on ranges of system resource levels such as memory and available processor resources.

12 Claims, 9 Drawing Sheets

Multicast Repair Tree

Multicast Repair Tree

Multicast Message Processing

Potential Head

Potential Group Member

An Algorithm for Computing a Rank Value

Head

Receiver

Example of Packet Format for Advertisement Message

US 6,185,698 B1

METHOD AND APPARATUS USING RANKING TO SELECT REPAIR NODES IN FORMATION OF A DYNAMIC TREE FOR MULTICAST REPAIR

FIELD OF THE INVENTION

The present invention relates generally to network communications. More specifically, the present invention is a method and apparatus for using ranking to select repair nodes in formation of a dynamic tree for multicast repair

BACKGROUND OF THE INVENTION

Internet Protocol (IP) multicasting is useful for disseminating data to a large group of receivers in a network. Multicast is a form of network communication in which a transmitting node, or sender, sends a single message to multiple destinations at once. The multiple destinations are the recipients, or receivers of the message. Other methods of network communication include broadcast, in which a sender transmits to all possible recipients, and unicast, in which the sender transmits only to one specific recipient. Multicast is described in more detail in D. Comer, *Internetworking with TCP/IP*, Prentice Hall, 1991, Chapter 17, which is herein incorporated by reference to the extent that it is not inconsistent with the present invention.

A multicast sender node sends a message to a multicast address. The sender transmits the message to any receivers that are listening for messages at the same multicast address. A set of receivers listening for messages at a particular multicast address are associated with the sender and form a multicast group in which the receivers are group members.

As the number of receivers joining a multicast group becomes large, the sender becomes overworked and slows down as a result of having to process notifications of receipt and requests for multicast repair from group members (receivers). Multicast repair is the process of the sender resending a multicast message in response to a request for retransmission (a "repair" request) from a receiver. The increased network traffic may cause a loss of data messages due to errors and overloading in the networking equipment.

SUMMARY OF THE INVENTION

In an embodiment consistent with the present invention, the sender sets up a hierarchical tree structure containing a plurality of receivers in which the sender is the root of the tree. The branches of the tree are repair groups. A repair group is a subset of the multicast group. The sender is the head of a first repair group. Each repair group contains a head and at least one receiver.

Each receiver has a ranking value corresponding to its ability to perform the duties of a head. Except for the sender, each of the heads are receivers which have a high enough ranking value to perform the duties of a head. If this ranking value is high enough, the receiver becomes a head and starts advertising for new members by sending multicast control messages containing the head's ranking value.

A receiver collects advertisement messages from heads which are available (for example, heads which are nearby). The receiver uses the ranking values in these advertisements to rank the heads, and then picks the most suitable head based on the ranking. The receiver then responds to the advertisement messages by sending a join request message to the head it picked. If the head rejects the receiver's membership request, the receiver sends a join request to the next most suitable head, i.e., the next highest ranked head.

As some of the receivers become heads and other receivers become associated with those heads by joining groups, a hierarchical tree structure forms.

A receiver's ranking value can fall within at least three value ranges: (1) "unable" to serve as a head, (2) "able" to serve as a head, and (3) "willing" to serve as a head. "Willing" to serve as a head indicates that the receiver is a very good head candidate, thus ranking it higher than a head which is "able" to serve. In an embodiment consistent with the present invention, the value ranges may be represented by a point range from zero to ten, where zero represents "unable" to serve as a head, 1–9 represent "able" to serve as a head, and 10 represents "willing" to serve as a head. Additional ranking values may be added to provide greater ranking flexibility by creating multiple levels of heads. For example, a value of "reluctant" may be added to indicate a receiver which is "able" to serve but does not have as much resource capacity to serve as a receiver which is "willing" to serve.

The sender delegates multicast repair to the heads in the tree so that the sender provides multicast repair only to a subset of the total receivers in the multicast group. This reduces the sender's workload and enables the sender to send messages to larger multicast groups. The sender transmits multicast messages to all of the receivers at the multicast group address at a data rate which is preconfigured or dynamically determined. Receivers that have joined a group and become associated with a head may request re-transmissions of the multicast message from their associated head.

In accordance with an embodiment consistent with the present invention, a method and apparatus for forming a multicast repair tree performed by a data processor includes the step of determining a ranking value associated with a potential head for each of a plurality of potential heads in a multicast group. A potential head sends advertisements containing its ranking value. A plurality of potential receivers receive the advertisements. A potential receiver prioritizes the ranking values from the potential heads and binds to the head having the highest ranking value, thereby forming a group of which the potential receiver is a receiver and the potential head is the head. The head may be the sender of the multicast message. There may be a plurality of heads. There may be two or more possible ranking values including "able", "unable", "willing", and "reluctant" to perform the duties of a head.

In accordance with an embodiment consistent with the present invention, a method and apparatus for forming a multicast repair tree, performed by a data processor, comprises the steps of determining, for each of a plurality of potential heads, a ranking value associated with the potential head; advertising, by the potential heads to a plurality of potential receivers; prioritizing, by a potential receiver, the ranking values from the potential heads; and binding, by a potential receiver to the potential head having the highest ranking value, thereby forming a repair group of which the potential receiver is a member and the highest ranking potential head is the head. An embodiment consistent with the present invention may be implemented as a computer program product or as a computer data signal embodied in a carrier wave. In accordance with another embodiment consistent with the present invention, a method and apparatus for forming a multicast repair tree, performed by a data processor, comprises the steps of receiving a plurality of advertisements, each containing a ranking value, from the potential heads; prioritizing the ranking values from the potential heads; and binding to the potential head having the highest ranking value, thereby forming a group in which the highest ranking potential head is the head. An embodiment consistent with the present invention may be implemented as a computer program product or as a computer data signal embodied in a carrier wave. In accordance with an embodiment consistent with the present invention, a method and apparatus for forming a multicast repair tree, performed by a data processor programmed to be a potential head, comprising the steps of determining a ranking value associated with the potential head; advertising to a plurality of potential receivers in accordance with the ranking value; receiving a join message from a potential receiver; and adding the potential receiver to a group in accordance with a predetermined limit. An embodiment consistent with the present invention may be implemented as a computer program product or as a computer data signal embodied in a carrier wave.

Advantages of the invention will be set forth, in part, in the description that follows and in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to embodiments consistent with the present invention, examples of which are illustrated in the accompanying drawings. Wherever possible, the same reference numbers will be used throughout the drawings to refer to the same or like parts.

Figure 1:
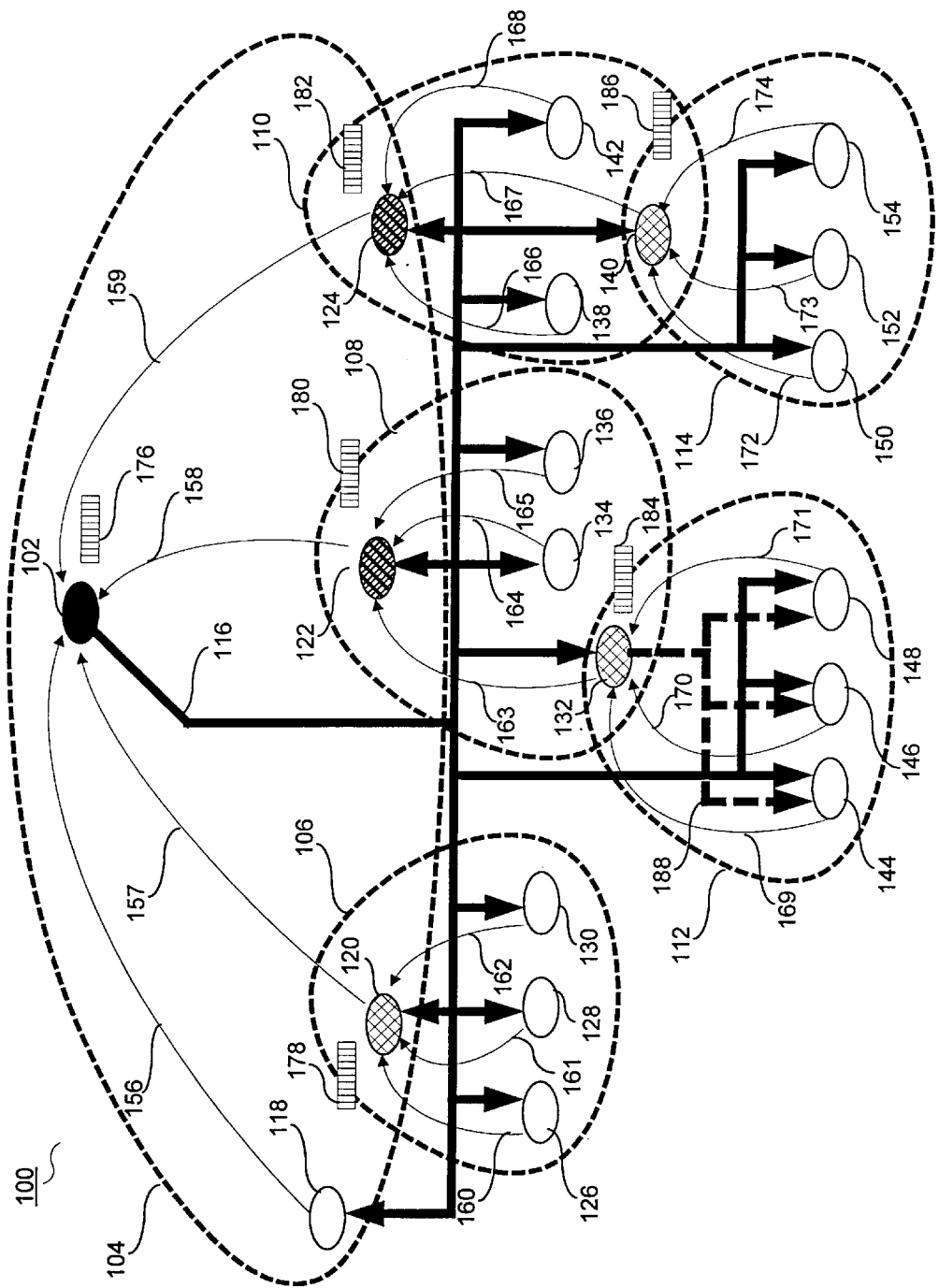
FIG. 1 is a diagram of a multicast repair tree in accordance with an embodiment consistent with the present invention.

FIG. 1 shows a network 100 in accordance with an embodiment consistent with the present invention and includes a sender node 102 and a plurality of receivers 118–154. Each of receivers 118–154 are part of the sender node's multicast group, as shown by multicast message path shown by arrow 116 which connects a sender 102 to each of receivers 118–154 in a multicast group.

Receivers 118–154 are organized in five subgroups 106–114. These subgroups are called repair groups. Each repair group includes a head and at least one receiver.

The following paragraphs describe the repair groups included in the multicast repair tree shown in FIG. 1. Note that all of the group members and most of the heads (except for the sender) are receiver nodes. In general, the heads are sender node 102 and receiver nodes 120, 122, 124, 132, and 140. The nodes which are only receivers (i.e., not heads) are receivers 118, 126, 128, 130, 134, 136, 138, 142, 144, 146, 148, 150, 152, and 154.

Group 104 contains a head 102 (which is also the sender) and group members 118, 120, 122, and 124 which are associated with head 102. Group 104 members 120, 122, and 124 are designated as heads for the next level of repair groups 106, 108, and 110, but group 104 member 118 is a not repair head and therefore does not have a group associated with it.

Group 106 includes a head 120 and group members 126, 128, and 130. Heads may also be group members. For example, head 120 is the head of group 106 but also is a member of group 104.

Group 108 includes a head 122 and group members 132, 134, and 136. Group member 132 is also the head of group 112. Group 112 includes a head 132 and receiver members 144, 146, and 148.

Group 110 includes a head 124 and members 138, 140, and 142. Head 124 is also a member of group 104, and group member 140 is the head of group 114. Group 114 includes a head 140 and members 150, 152, and 154.

A sender node 102 sends multicast messages to the receivers in the multicast repair tree along multicast message path 116 to receivers 118–154.

Sender 102 stores the message in a cache 176 until it receives an acknowledgment of receipt of the data packet from each of its group members, i.e., receivers 118, 120, 122, and 124. The acknowledgment of receipt may be a unicast message from each of the group members 118, 120, 122, and 124 to the sender 102 as shown by arrows 156, 157, 158, and 159 respectively.

Similarly, each of the other heads in the repair tree store the multicast message in data cache until receiving an acknowledgment of receipt from their respective group members. Heads 120, 122, 124, 132, and 140 store the message in a data cache 178, 180, 182, 184, and 186, respectively associated with each head.

After the multicast data message is sent, the head of each repair group waits for an acknowledgment of receipt from each of its group members Head 120 of group 106 waits for an acknowledgment of receipt from each of its members as shown by arrow 160 from receiver 126, arrow 161 from receiver 128, and arrow 162 from receiver 130. Head 122 of group 108 waits for acknowledgments of receipt as shown by arrows 163, 164, and 165 from receivers 132, 134, and 136, respectively. Head 124 of group 110 waits for acknowledgments of receipt as shown by arrows 166, 167, and 168 from receivers 138, 140, and 142, respectively. Head 140 of group 114 waits for acknowledgments of receipt as shown by arrows 172, 173, and 174 from receivers 150, 152, and 154, respectively. Head 132 of group 112 waits for acknowledgments of receipt as shown by arrows 169, 170, and 171 from receivers 144, 146, and 148, respectively.

Multicast repair is shown in group 112, in which head 132 has received a repair request from at least one of its group members 144, 146, or 148. When this happens, head 132 re-sends the multicast message which it has stored in cache 184 to each of its group members along a multicast repair path 188 shown by the dotted line arrows.

Figure 2:
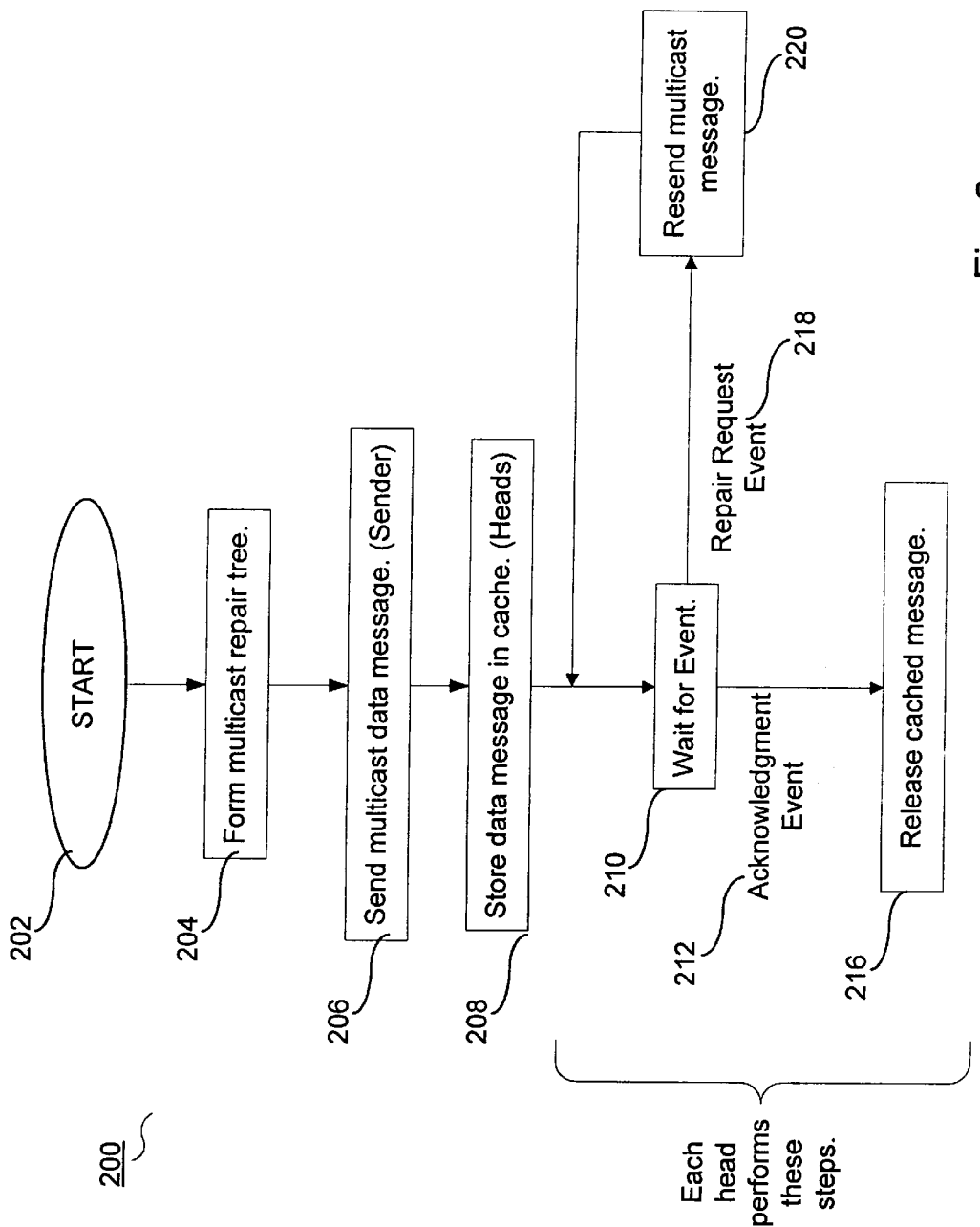
FIG. 2 is a flow chart showing steps performed by a data processing system programmed to process multicast messages in accordance with an embodiment consistent with the present invention to disseminate and repair multicast messages.

FIG. 2 is a flowchart 200 showing steps performed by a data processing system to process multicast messages, beginning at step 202. After the multicast repair tree is formed in step 204, a sender 102 sends a multicast data message, in step 206. More detail on the formation of the multicast tree is presented in the discussion of FIGS. 3–6. In step 208, sender 102 and heads 120, 122, 124, 132, and 140 store this multicast data message in their respective cache 176, 178, 180, 182, 184, 186.

In step 210, a head (including the sender which also performs as a head) waits for an event. These events are processed by each head in response to their group members and include an acknowledgment event 212 and a repair request event 218. If no other events occur, the head waits in a dormant state until it receives the next event. An acknowledgment event 212 is a notification from all of the head's group members that they have received the multicast data message. After receiving an acknowledgment event 212, the head releases the cached message in step 216. The head also may release the cached message under other circumstances, for example, if the cache fills up.

A repair request 218 is a request sent to the head by at least one of the group members for the head to retransmit the multicast data message. If the head receives a repair request 218 from one of its group members, the head performs multicast repair in step 220, i.e., the head retransmits the multicast data message (from the copy stored in cache) to the group. An example of multicast repair is shown by dotted-line arrows 188 in FIG. 1. The head performs multicast repair on a demand basis. After re-sending the multicast message in step 220, the head goes back to step 210 and waits for another event.

Figure 3:
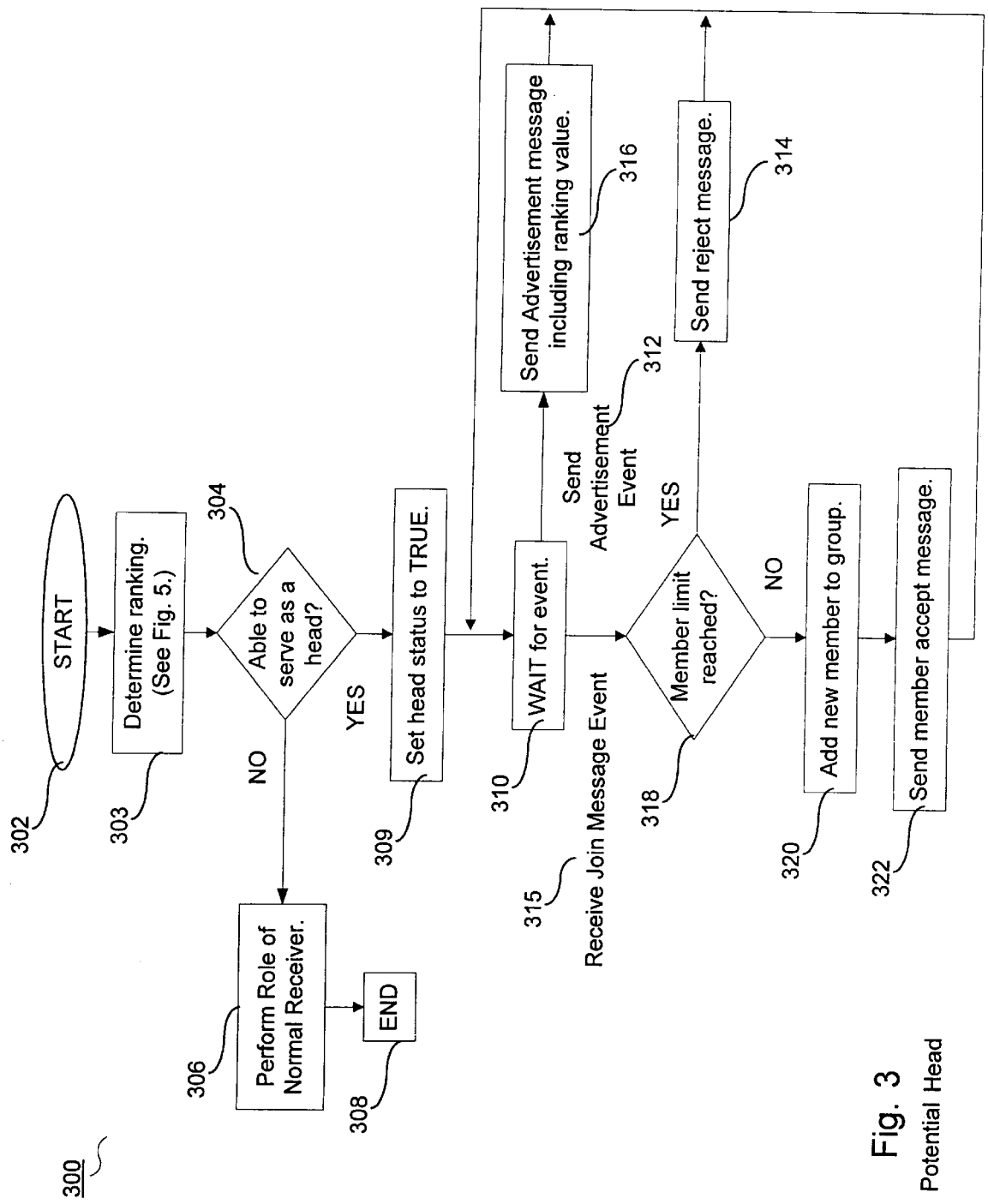
FIG. 3 is a flow chart showing steps performed by a data processing system programmed to be a potential head in accordance with an embodiment consistent with the present invention.

FIG. 3 is a flowchart 300 showing steps performed by a data processing system programmed to be a potential head in accordance with an embodiment consistent with the present invention, starting at step 302.

In step 303, a receiver which potentially could be a head determines its ranking value. (See FIG. 5.) The potential head, in step 304, uses the ranking value to determine whether it is able to serve as a head. The ranking value may be a bit, a flag, or any appropriate value which indicates whether a receiver is eligible to perform the duties of a head. The ranking value may be statically or dynamically configured. If the ranking value is sufficiently high, for example, if it corresponds to the level of "reluctant", "able", or "willing" to be a head, then the receiver sets its head status to TRUE in step 309, and begins to serve as a head The head then waits for an event in step 310. Otherwise, if the receiver is not able to serve as a head, the receiver simply performs the role of a normal receiver in step 306 and processing of that receiver stops at step 308.

Once the receiver is selected as being able to perform as a head, it waits in step 310 for an event such as a send advertisement event 312 or a receive join message event 315. An advertisement is a control message that lets potential group members know that a node is available to serve as a head. Receivers that are looking for a group to join, also known as potential group members, collect advertisement messages and use the ranking information contained in them to select a head. Head selection criteria are presented in more detail in the discussion of FIGS. 4–6. Advertisement messages are presented in more detail below in the discussion of FIG. 9. If a send advertisement event 312 occurs, the head sends an advertisement message including a ranking value in step 316, after which the head continues to wait for another event at step 310.

Assuming that there are receivers available which are interested in joining a group and are listening for advertisements, the head eventually receives a join message event 315 from a receiver. A join message is a request from a potential group member (receiver) to a head. A receiver selects a highest-ranked head from the heads represented by the list of advertisements that the receiver has collected. After selecting a highest-ranked head, the receiver sends a request to join that head's group. Join messages are presented in more detail in the discussion of FIG. 4. This starts the process of binding a receiver to the head's repair group. When the head receives a join message request 315, the head checks to find out if it has reached its member limit, step 318. The member limit may be any appropriate limit on the number of group members which a particular head may accommodate. The member limit typically depends on available system resources such as memory and compute power, but may be related to any appropriate criteria. A typical value for the member limit is 32 members per group head due to system resource limitations in one implementation consistent with the present invention.

If the member limit has been reached, the head does not accept the receiver into the group, sends the receiver a reject message in step 314, and then continues to wait for another event at step 310. If the member limit has not been reached then the head adds the new member to the group in step 320, and sends a member accept message to the new member in step 322 to inform the requesting receiver that it has become a member of the head's repair group. This completes the binding process. The receiver is now a member of the head's group and may send repair requests to the head. This receiver may also become a head and form subgroups, thereby adding branches to the tree.

Figure 4:
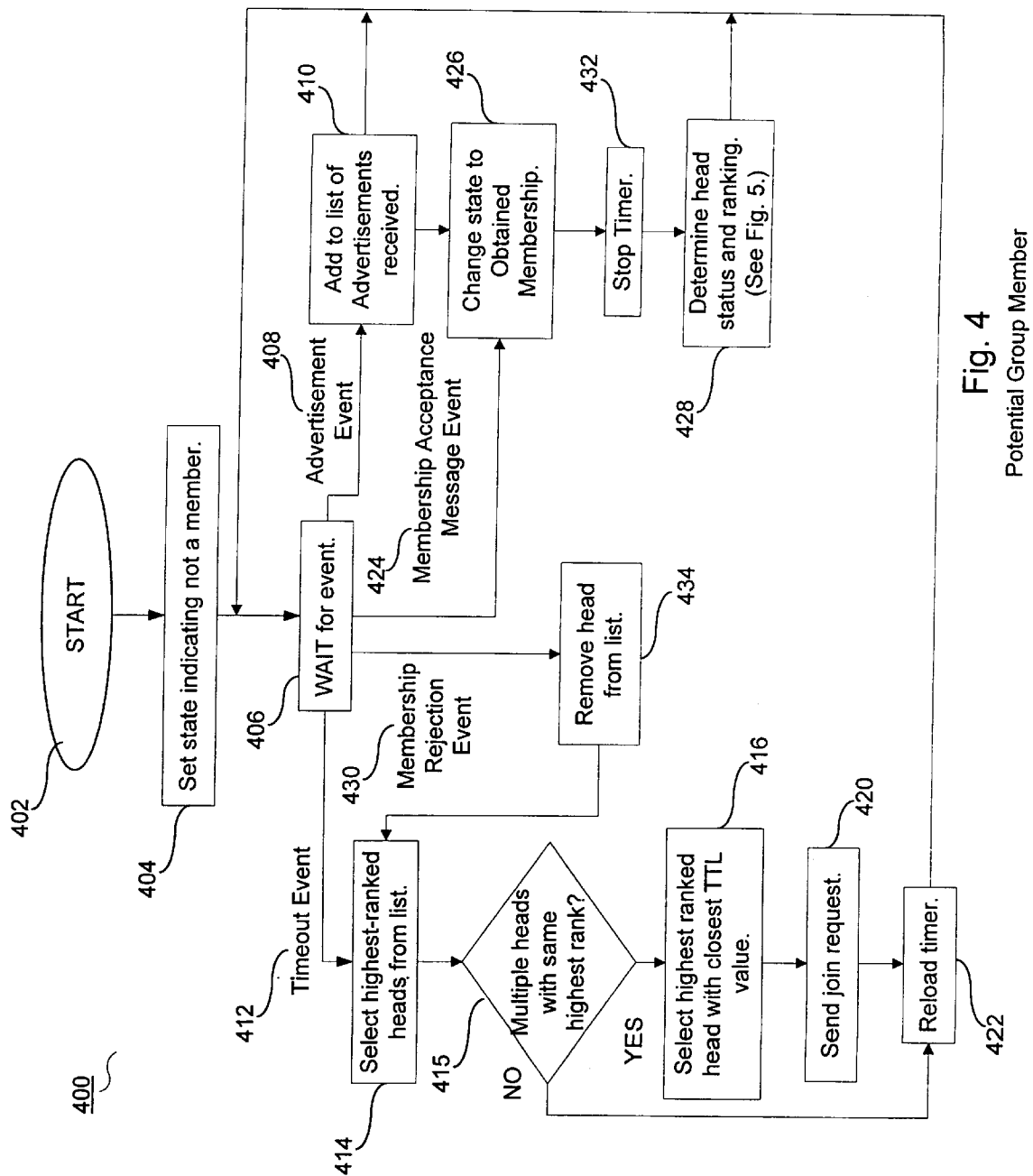
FIG. 4 is a flow chart showing steps performed by a data processing system programmed to be a potential group member in accordance with an embodiment consistent with the present invention.

FIG. 4 is a flowchart 400 showing steps performed by a data processing system programmed to be a potential group member (receiver) in accordance with an embodiment consistent with the present invention which starts at step 402. In step 404, the receiver initially sets a state indicating that it is not a member of any group and then waits for an event in step 406.

Events which occur include a timeout event 412, a received advertisement event 408, a received membership rejection event 430, and a received member acceptance message event 424. If a received advertisement event 408 occurs, the potential group member adds the advertisement to a list of received advertisements in step 410 and then returns to step 406 to wait for another event.

The potential group member continues to receive advertisements until a time-out event 412 occurs. The timeout value for collecting advertisements in an embodiment consistent with the present invention may be set to three times a predetermined head advertisement interval. The head advertisement interval may be set to roughly three seconds.

Other values may be used for the advertisement collection interval and the head advertisement interval as appropriate to a particular application. The potential group member selects the highest-ranked heads from the list in step 414. If there is only one head with the highest rank, the receiver selects only one head. However, if multiple heads have the same highest ranking, then the receiver selects all of them in order to perform arbitration between heads having the same rank. The arbitration process is described below in the discussion of steps 414 and 415. The advertisements in the list created in step 410 contain the ranking values of the heads which are advertising. These ranking values may be stored in a data structure, such as an array or a list.

After selecting the highest-ranked heads in step 414, the potential group member checks if there are multiple heads with the same rank in step 415. If not, then processing continues at step 422 where a timer is reloaded with a predetermined value. The predetermined value represents an advertisement interval and corresponds to the length of time that a receiver waits for advertisements before processing them. This timer is also discussed in connection with step 432 described below. If there are multiple heads with the same rank then the potential group member selects the highest-ranked head with the closest TTL value in step 416. The head with the closest TTL value is the one requiring the fewest number of hops to reach and is based at least in part by its physical proximity to the potential group member. Step 416 is an example of a tie-breaking policy which may be specified. The potential group member determines which head has the highest ranking and in step 420, sends a join request to the highest ranking head. A timer is then reloaded with a predetermined value in step 422 after which the potential group member returns to step 406 to wait for another event.

In response to join request 420, the potential group member may be rejected, causing a received membership rejection event 430 to occur. After rejection, the potential group member removes the head which sent the rejection message from its list of heads in step 434, and then continues to step 414 where it selects the highest-ranked members from a list and continues processing as described above. If a potential group member receives a member acceptance message event 424, the potential group member changes its state to obtained membership in step 426, stops a timer corresponding to the wait for advertisements interval in step 432, and then determines its head status and ranking in step 428. This timer is also used in connection with step 422 described above. The potential group member then returns to step 406 and waits for another event.

Figure 5:
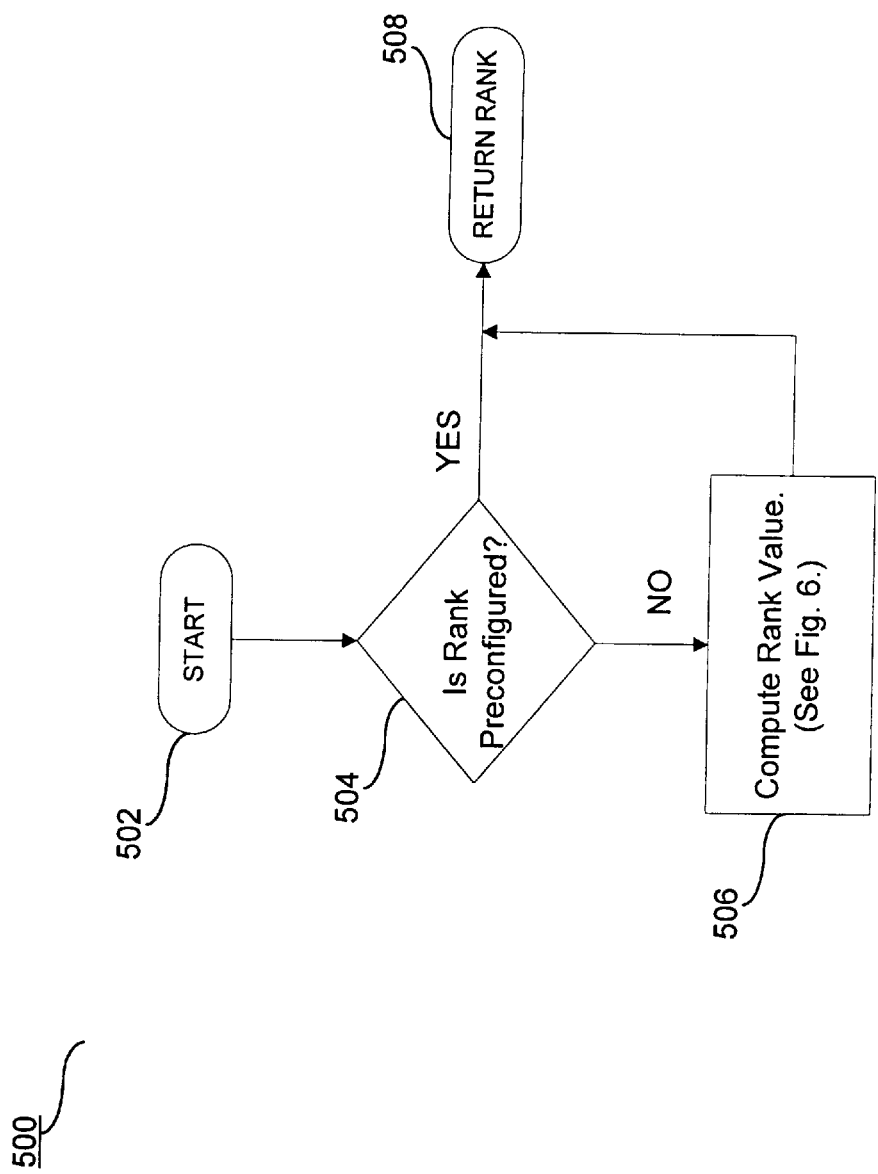
FIG. 5 is a flow chart showing steps performed by a data processing system programmed to determine ranking in accordance with an embodiment consistent with the present invention.

FIG. 5 is a flowchart 500 showing steps performed by a data processing system programmed as a head or a potential head to determine a receiver's ranking value in accordance with an embodiment consistent with the present invention which starts at step 502. In step 504, the receiver determines whether its rank has been preconfigured. A receiver may be statically configured to be a head. A statically configured head may be set to always be a head or to never be a head. For example, someone who owns a particular receiver node who does not want to share the receiver's resources with the rest of the network and does not want the receiver to be used for servicing repair requests may specify that his system is never to be used as a head by setting the receiver statically to a ranking value of "unable" to be a head. If the receiver is statically configured to be a head, then its ranking value is set to "able" to serve as a head and is returned in step 508. The receiver then returns to be processed as a potential head, in step 304 of flow chart 300.

If the receiver is not statically configured to be a head, it can be dynamically configured to be a head. The process of determining whether a receiver is dynamically configured to be a head is performed at step 506, where the receiver computes its ranking value. Step 506 may be performed by a method such as that shown by flowchart 600 of FIG. 6. After the receiver computes its ranking value, that value is returned at step 508. The ranking value is returned to step 304 of flow chart 300.

Figure 6:
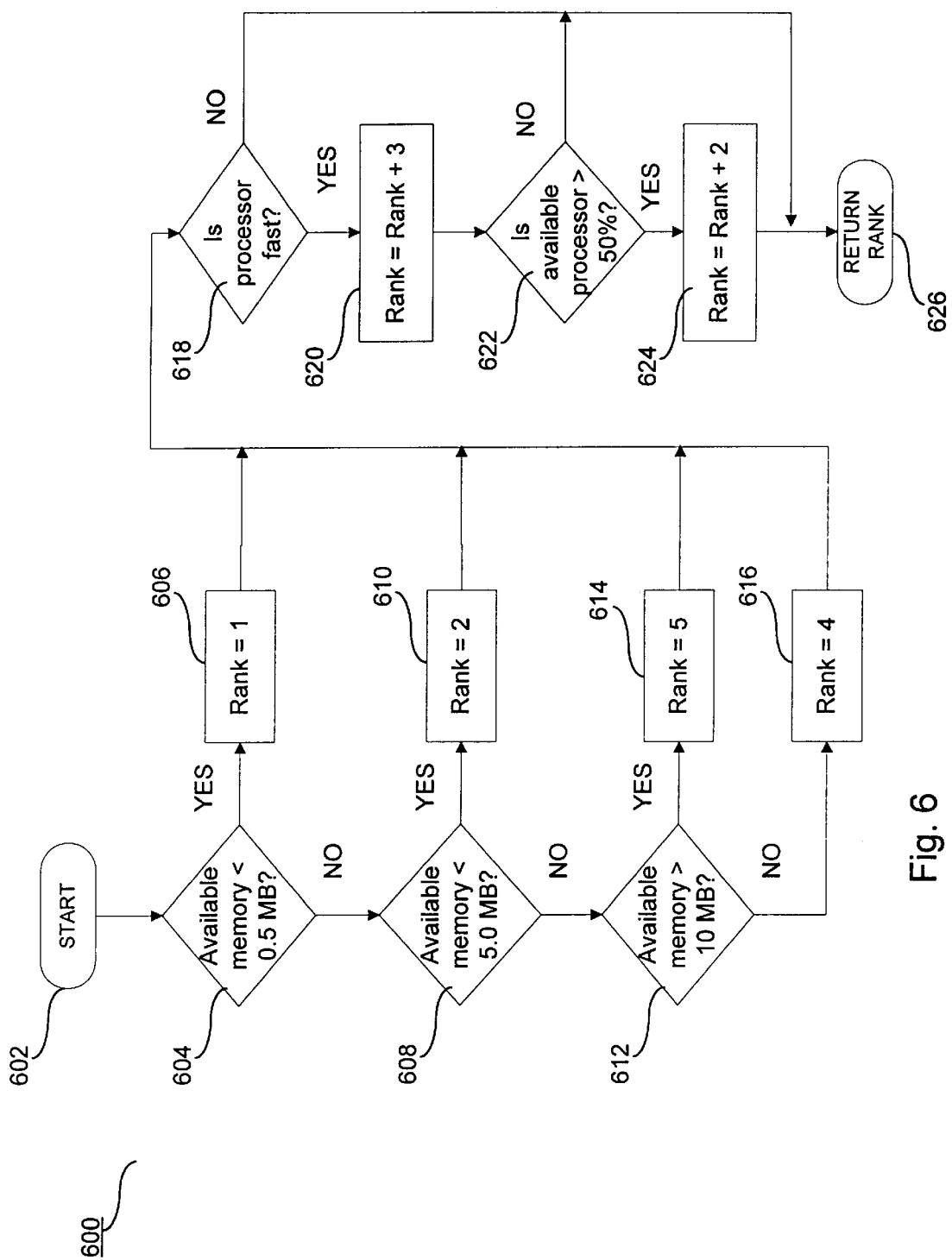
FIG. 6 is a flow chart showing steps performed by a data processing system programmed to perform an algorithm for computing a ranking value in accordance with an embodiment consistent with the present invention.

FIG. 6 is a flowchart 600 showing steps performed by a data processing system programmed as a head or a potential head to determine a receiver's ranking value in accordance with an embodiment consistent with the present invention which starts at step 602. First, the head or potential head checks the amount of available memory. In step 604, the head or potential head checks whether the amount of available memory is less than 0.5 megabyte. If so, then the head or potential head sets the ranking value to be one, in step 606. If not, then the head or potential head continues to step 608 and checks whether the amount of available memory is less than 5.0 megabytes. If so, then the head or potential head sets the ranking value to be two, in step 610. If not, then the head or potential head continues to step 612 and checks whether the amount of available memory is greater than ten megabytes. If so, then the head or potential head sets the ranking value to be five in step 614. If not, then the head or potential head sets the ranking value to be four in step 616.

After performing any of steps 606, 610, 614, and 616, the head or potential head checks for available processing power, starting with step 618 where the head or potential head checks whether it has a fast processor. If so, then the head or potential head adds three to the current ranking value in step 620. If not, then the head or potential head returns the ranking value in step 626 and continues processing at step 304 of flowchart 300 shown in FIG. 3.

After adding three to the current ranking value in step 620, the head or potential head checks whether greater than 50% of the processor is available in step 622. The level of available processor power is a affected by factors including but not limited to the type of processor being used, the number of tasks the processor being executed, and how compute-intensive the tasks are. The level of available processor power may be determined by any appropriate method known to a person having ordinary skill in the art. If greater than 50% of the processor is available, then the head or potential head adds two to the current ranking value and returns the ranking value in step 626 as described above. If greater than 50% of the processor is not available in step 622, then the head or potential head simply returns the current ranking value in step 626 as described above. Determining a ranking value is not limited to checking available memory and processing power. Consistent with an embodiment of the present invention, other system resources could be checked and used for determining a ranking value, for example, network bandwidth, available disk space or other storage, and input/output loads.

Figure 7:
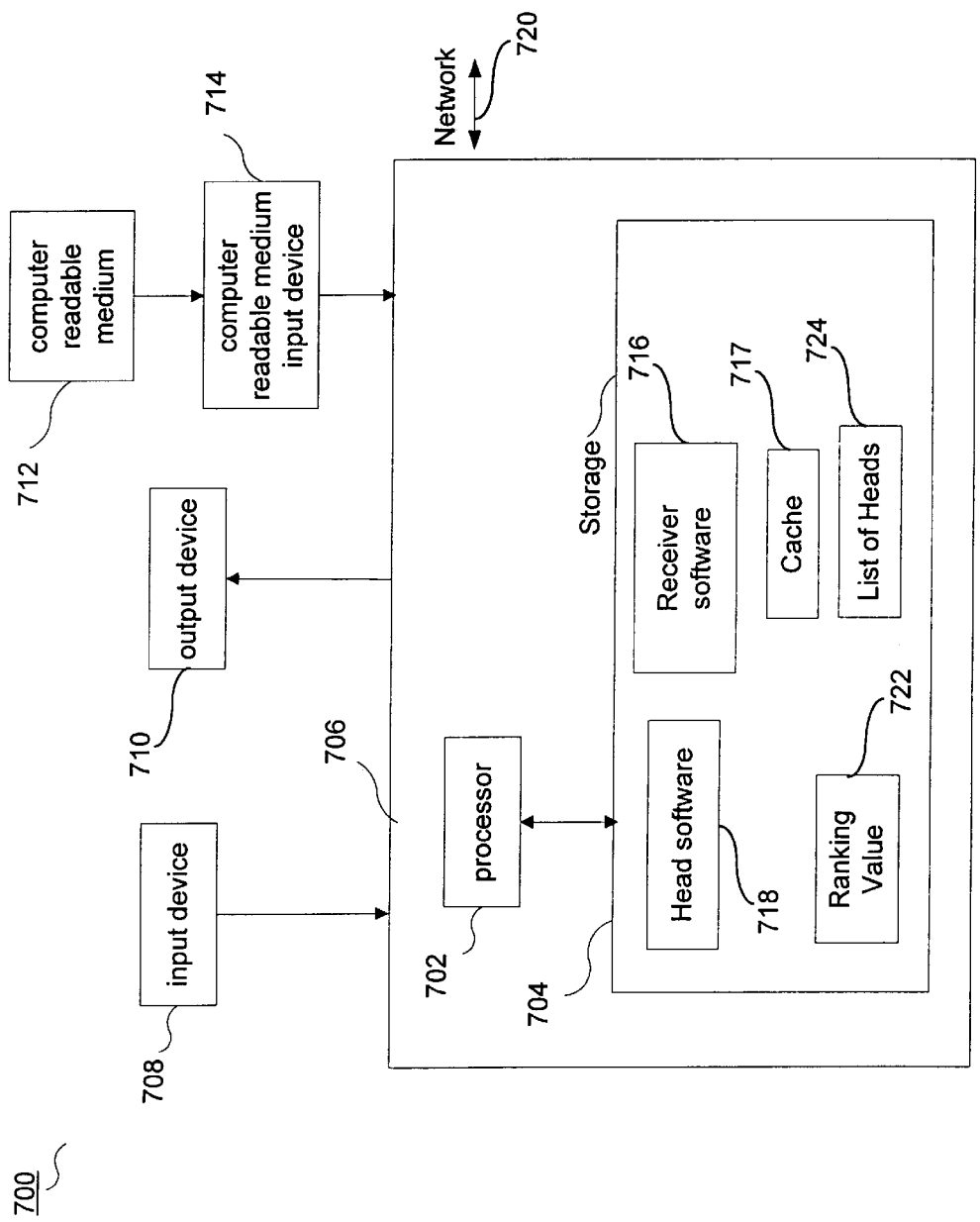
FIG. 7 is a diagram showing a data processing system programmed to be a head in accordance with an embodiment consistent with the present invention.

FIG. 7 shows a computer system 700 which includes a processor 702, storage 704, which includes head software 718 programmed to perform the functions of a head, and receiver software 716 programmed to perform the functions of a receiver, a ranking value 722, a cache 717, and a list of heads 724. Computer system 700 also includes a network connection 720, an input device 708, output device 710, computer readable medium 712, and computer readable input device 714. Each of the nodes in network 100 may be a computer system such as computer system 700, connected other nodes in the network via network connection 720.

Since the same node can be a receiver and also a head, head software 718 and receiver software 716 are both shown as being part of system 700 inside storage 704.

A person of ordinary skill in the art will understand that data processing system 700 may also contain additional information, such as input/output lines; input devices, such as a keyboard, a mouse, and a voice input device; and display devices, such as a display terminal. Input device 708 may be a floppy disk drive, CD ROM reader, or DVD reader, that reads computer instructions stored on a computer readable medium, such as a floppy disk, a CD ROM, or a DVD drive. Data processing system 700 also may include application programs, operating systems, data, etc., which are not shown in the figure for the sake of clarity. It also will be understood that data processing system 700 may also include numerous elements not shown, such as disk drives, keyboards, display devices, network connections, additional memory, additional CPUs, LANs, input/output lines, etc.

In the following discussion, it will be understood that the steps of methods and flow charts discussed preferably are performed by an appropriate processor 702 executing instructions stored in storage 704. It will also be understood that the invention is not limited to any particular implementation or programming technique and that the invention may be implemented using any appropriate techniques for implementing the functionality described herein. The invention is not limited to any particular programming language or operating system.

The instructions in storage 704 may be read from computer-readable medium 712. Execution of sequences of instructions contained in storage 704 causes processor 702 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Figure 8:
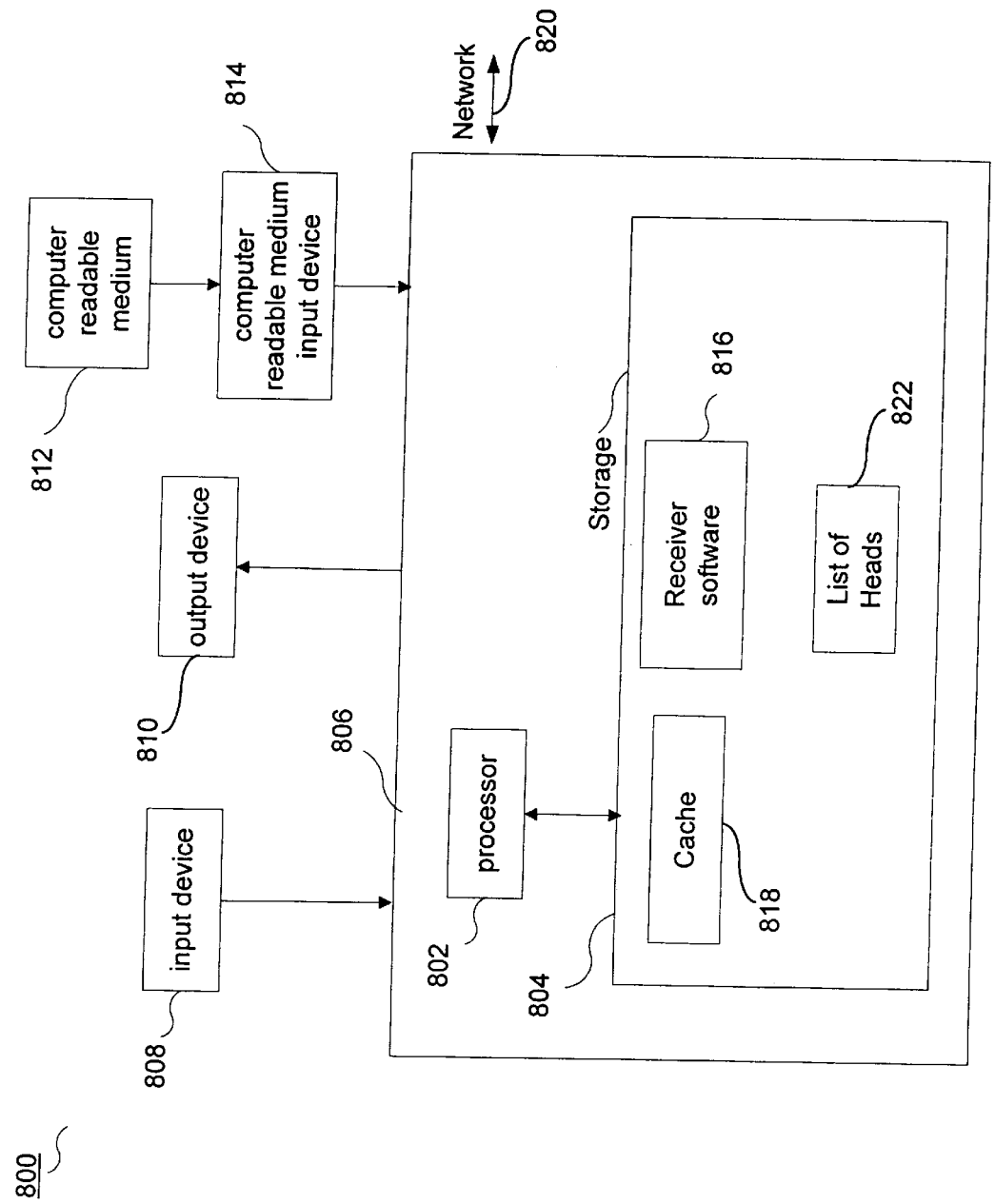
FIG. 8 is a diagram showing a data processing system programmed to be a receiver in accordance with an embodiment consistent with the present invention.

FIG. 8 shows a computer system 800 which includes a processor 802, storage 804, which includes receiver software 816 programmed to perform the functions of a receiver, a ranking value 822, a cache 818, and a list of heads 822. Computer system 800 also includes a network connection 820, an input device 808, output device 810, computer readable medium 812, and computer readable input device 814. Each of the nodes in network 100 may be a computer system such as computer system 800, connected other nodes in the network via network connection 820. Since the same node can be a receiver and also a head, head software 818 and receiver software 816 are both shown as being part of system 800 inside storage 804.

A person of ordinary skill in the art will understand that data processing system 800 may also contain additional information, such as input/output lines; input devices, such as a keyboard, a mouse, and a voice input device; and display devices, such as a display terminal. Input device 808 may be a floppy disk drive, CD ROM reader, or DVD reader, that reads computer instructions stored on a computer readable medium, such as a floppy disk, a CD ROM, or a DVD drive. Data processing system 800 also may include application programs, operating systems, data, etc., which are not shown in the figure for the sake of clarity. It also will be understood that data processing system 800 may also include numerous elements not shown, such as disk drives, keyboards, display devices, network connections, additional memory, additional CPUs, LANs, input/output lines, etc.

It will be understood that the steps of methods and flow charts discussed preferably are performed by an appropriate processor 802 executing instructions stored in storage 804. It will also be understood that the invention is not limited to any particular implementation or programming technique and that the invention may be implemented using any appropriate techniques for implementing the functionality described herein. The invention is not limited to any particular programming language or operating system.

The instructions in storage 804 may be read from computer-readable medium 812. Execution of sequences of instructions contained in storage 804 causes processor 802 to perform the process steps described herein. In alternative embodiments, hard-wired circuitry may be used in place of or in combination with software instructions to implement the invention. Thus, embodiments of the invention are not limited to any specific combination of hardware circuitry and software.

Figure 9:
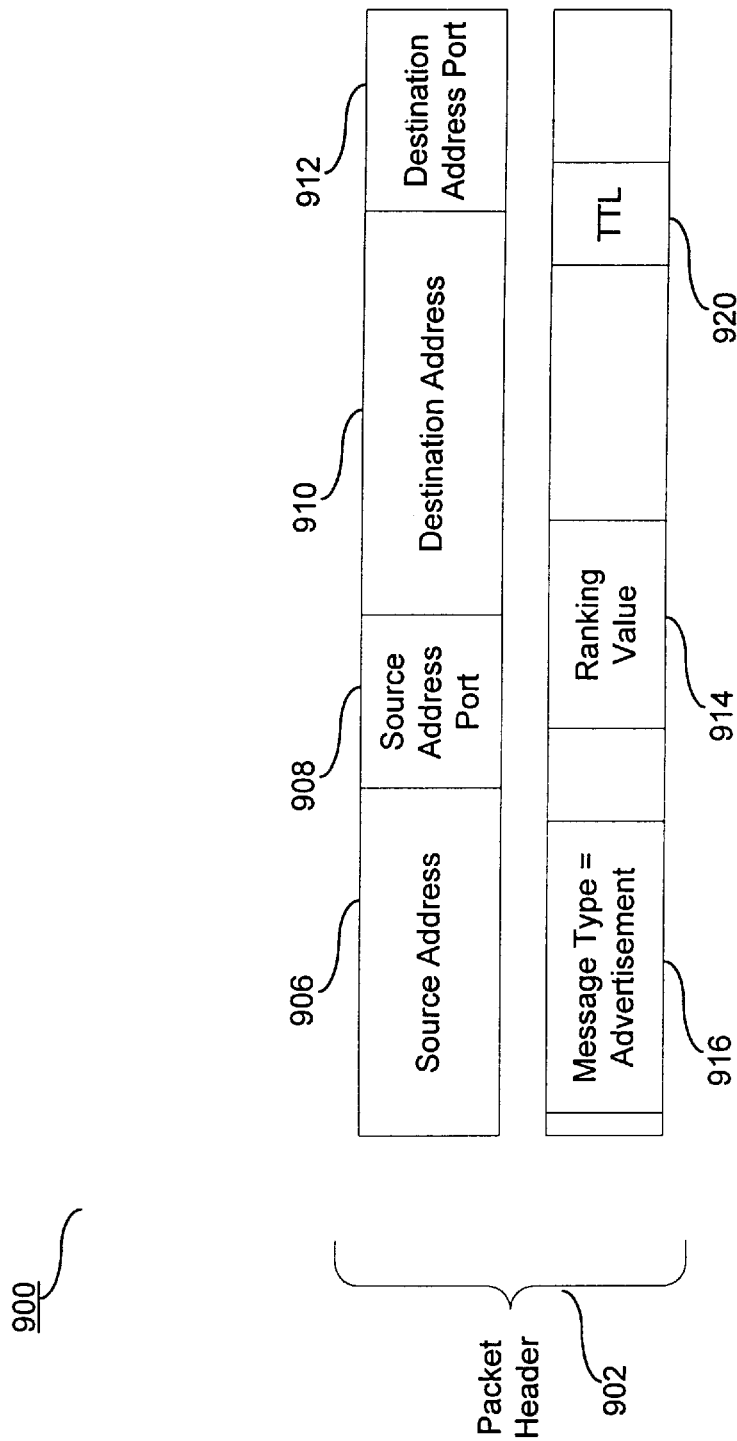
FIG. 9 is an exemplary format of an advertisement message packet in accordance with an embodiment consistent with the present invention.

FIG. 9 shows an example of a multicast advertisement message packet format 900 which is used in an embodiment consistent with the present invention. Packet format 900 contains a packet header 902. Packet header 902 is used for processing the advertisement message packet and includes fields indicating at least the following: a source address 906, a source address port 908, a destination address 910, and a destination port 912. These fields are included in a typical multicast message packet format. Also included in the packet header of an advertisement message are a ranking value 914 associated with the advertising head, a message type 916 indicating that the packet is an advertisement message, and a field 920 indicating a current TTL (Time to Live). The TTL is used in conjunction with the ranking value by a potential group member in picking which head is the best. The potential group member uses the number of hops to determine how far way the head is from the potential group member, and uses the TTL to determine how old the advertisement is. Better heads are closer to the potential group member and have more recent advertisements.

There are two kinds of multicast messages: control messages and data messages. Control messages are used for tasks such as setting up the multicast data distribution set-up (also known as a multicast repair tree) and for advertising for group members. Control messages typically contain only protocol-related information and are used for communication between nodes in the multicast data distribution set-up, for example when a receiver sends a receipt of acknowledgment to a head. Data messages contain data which the sender distributes to the receivers in the multicast group.

Multicast advertisement message packet format 900 is an example of a control message used in an embodiment consistent with the present invention and includes a Ranking Value field 914. Heads send out multicast advertisement messages according to packet format 900 to potential group members. Ranking Value 914 may be a bit, a flag, a signal, or any similar means for setting a value.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for forming a multicast repair tree, performed by a data processor, comprising the steps of:
   determining, for each of a plurality of potential heads, a ranking value associated with the potential head, wherein the ranking value is selected from a group including "able", "unable" and "reluctant";
   advertising, by the potential heads to a plurality of potential receivers; prioritizing by a potential receiver, the ranking values from the potential heads; and
   binding, by a potential receiver to the potential head having the highest ranking value, thereby forming a repair group of which the potential receiver is a member and the highest ranking potential head is the head.

2. A method for forming a multicast repair tree, performed by a data processor, comprising the steps of:
   determining, for each of a plurality of potential heads, a ranking value associated with the potential head, wherein the ranking value is selected from a group including "able", "unable" and "willing";
   advertising, by the potential heads to a plurality of potential receivers; prioritizing, by a potential receiver, the ranking values from the potential heads; and
   binding, by a potential receiver to the potential head having the highest ranking value, thereby forming a repair group of which the potential receiver is a member and the highest ranking potential head is the head.

3. A method for forming a multicast repair tree, performed by a data processor, comprising the steps of:
   (1) determining, for each of a plurality of potential heads, a ranking value associated with the potential head, including
      (a) determining whether the potential head has a static configuration, and
      (b) determining the ranking value of the potential head in accordance with a dynamic configuration if the potential head is not statically configured to be a head;
   (2) advertising, by the potential heads to a plurality of potential receivers; prioritizing, by a potential receiver, the ranking values from the potential heads; and
   (3) binding, by a potential receiver to the potential head having the highest ranking value, thereby forming a repair group of which the potential receiver is a member and the highest ranking potential head is the head.

4. A computer data signal embodied in a carrier wave and representing sequences of instructions which, when executed by a processor, cause said processor to form a multicast repair tree, by performing the steps of:
   executing a first computer program to determine, for each of a plurality of potential heads, a ranking value associated with the potential head, wherein the ranking value is selected from a group including "able", "unable", and "reluctant";
   executing the first computer program to advertise, by the potential heads, to a plurality of potential receivers;
   executing a second computer program to prioritize, by a potential receiver, the ranking values from the potential heads; and
   executing the second computer program to bind, by a potential receiver to the potential head having the highest ranking value, thereby forming a group of which the potential receiver is a member and the highest ranking potential head is the head.

5. A computer data signal embodied in a carrier wave and representing sequences of instructions which, when executed by a processor, cause said processor to form a multicast repair tree, by performing the steps of:
   executing a first computer program to determine, for each of a plurality of potential heads, a ranking value associated with the potential head, wherein the ranking value is selected from a group including "able", "unable"and "willing";
   executing the first computer program to advertise, by the potential heads, to a plurality of potential receivers;
   executing a second computer program to prioritize, by a potential receiver, the ranking values from the potential heads; and
   executing the second computer program to bind, by a potential receiver to the potential head having the highest ranking value, thereby forming a group of which the potential receiver is a member and the highest ranking potential head is the head.

6. A computer data signal embodied in a carrier wave and representing sequences of instructions which, when executed by a processor, cause said processor to form a multicast repair tree, by performing the steps of:
   (1) executing a first computer program to determine, for each of a plurality of potential heads, a ranking value associated with the potential head, including
      (a) executing a computer program to determine whether the potential head has a static configuration, and
      (b) executing a computer program to determine the ranking value of the potential head in accordance with a dynamic configuration if the potential head is not statically configured to be a head;
   (2) executing the first computer program to advertise, by the potential heads, to a plurality of potential receivers;
   (3) executing a second computer program to prioritize, by a potential receiver, the ranking values from the potential heads; and (4) executing the second computer program to bind, by a potential receiver to the potential head having the highest ranking value, thereby forming a group of which the potential receiver is a member and the highest ranking potential head is the head.

7. An apparatus for forming a multicast repair tree, comprising:

a circuit configured to determine, for each of a plurality of potential heads, a ranking value associated with the potential head, wherein the ranking value is selected from a group including "able", "unable" and "reluctant";

a circuit configured to advertise, by the potential heads to a plurality of potential receivers;

a circuit configured to prioritize, by a potential receiver, the ranking values from the potential heads; and a circuit configured to bind, by a potential receiver to the potential head having the highest ranking value, thereby forming a group of which the potential receiver is a member and the highest ranking potential head is the head.

8. An apparatus for forming a multicast repair tree, comprising:

a circuit configured to determine, for each of a plurality of potential heads, a ranking value associated with the potential head, wherein the ranking value is selected from a group including "able", "unable" and "willing";

a circuit configured to advertise, by the potential heads to a plurality of potential receivers;

a circuit configured to prioritize, by a potential receiver, the ranking values from the potential heads; and a circuit configured to bind, by a potential receiver to the potential head having the highest ranking value, thereby forming a group of which the potential receiver is a member and the highest ranking potential head is the head.

9. An apparatus for forming a multicast repair tree, comprising:

(1) a circuit configured to determine, for each of a plurality of potential heads, a ranking value associated with the potential head, including
   (a) circuitry configured to determine whether the potential head has a static configuration, and
   (b) circuitry configured to determine the ranking value of the potential head in accordance with a dynamic configuration if the potential head is not statically configured to be a head;

(2) a circuit configured to advertise, by the potential heads to a plurality of potential receivers;

(3) a circuit configured to prioritize, by a potential receiver, the ranking values from the potential heads; and (4) a circuit configured to bind, by a potential receiver to the potential head having the highest ranking value, thereby forming a group of which the potential receiver is a member and the highest ranking potential head is the head.

10. A computer program product, comprising:

a computer usable medium having computer readable code embodied therein for forming a multicast repair tree that includes one or more systems, the computer program product including:

first computer readable program code devices configured to determine, for each of a plurality of potential heads, a ranking value associated with the potential head, wherein the ranking value is selected from a group including "able", "unable" and "reluctant";

second computer readable program code devices configured to advertise, by the potential heads, to a plurality of potential receivers;

third computer readable program code devices configured to prioritize, by a potential receiver, the ranking values from the potential heads; and fourth computer readable program code devices configured to bind, by a potential receiver to the potential head having the highest ranking value, thereby forming a group of which the potential receiver is a member and the highest ranking potential head is the head.

11. A computer program product, comprising:

a computer usable medium having computer readable code embodied therein for forming a multicast repair tree that includes one or more systems, the computer program product including:

first computer readable program code devices configured to determine, for each of a plurality of potential heads, a ranking value associated with the potential head, wherein the ranking value is selected from a group including "able", "unable" and "willing";

second computer readable program code devices configured to advertise, by the potential heads, to a plurality of potential receivers;

third computer readable program code devices configured to prioritize, by a potential receiver, the ranking values from the potential heads, and fourth computer readable program code devices configured to bind, by a potential receiver to the potential head having the highest ranking value, thereby forming a group of which the potential receiver is a member and the highest ranking potential head is the head.

12. A computer program product, comprising:

a computer usable medium having computer readable code embodied therein for forming a multicast repair tree that includes one or more systems, the computer program product including:

first computer readable program code devices configured to determine, for each of a plurality of potential heads, a ranking value associated with the potential head, including
   computer readable program code devices to determine whether the potential head has a static configuration, and
   computer readable program code devices to determine the ranking value of the potential head in accordance with a dynamic configuration if the potential head is not statically configured to be a head;

second computer readable program code devices configured to advertise, by the potential heads, to a plurality of potential receivers;

third computer readable program code devices configured to prioritize, by a potential receiver, the rankling values from the potential heads; and fourth computer readable program code devices configured to bind, by a potential receiver to the potential head having the highest ranking value, thereby forming a group of which the potential receiver is a member and the highest ranking potential head is the head.

* * * * *